United States Patent [19]
DeSomer

[11] Patent Number: 5,173,901
[45] Date of Patent: Dec. 22, 1992

[54] COMMUNICATION SYSTEM FOR TRANSMITTING SYNCHRONOUS AND ASYNCHRONOUS CELL STREAMS OVER A SINGLE TRANSMISSION LINK

[75] Inventor: Michel P. M. DeSomer, Aalst, Belgium

[73] Assignee: Alcatel N.V., Amsterdam, Netherlands

[21] Appl. No.: 573,204

[22] Filed: Aug. 13, 1990

[51] Int. Cl.$^5$ .............................................. H04J 3/04
[52] U.S. Cl. .................................... 370/112; 370/60.1
[58] Field of Search .................... 370/60, 60.1, 85.12, 370/112, 12, 3

[56] References Cited

U.S. PATENT DOCUMENTS

| | | | |
|---|---|---|---|
| 4,813,037 | 3/1989 | Debuysscher et al. | 370/60 |
| 4,922,487 | 4/1990 | Eilenberger et al. | 370/60 |
| 4,926,416 | 5/1990 | Weik et al. | 370/60.1 |
| 4,965,790 | 10/1990 | Nishino et al. | 370/85.12 |
| 4,969,149 | 11/1990 | Killot et al. | 370/60 |

FOREIGN PATENT DOCUMENTS

| | | |
|---|---|---|
| 904100 | 7/1986 | Belgium . |
| A20250160 | 12/1987 | European Pat. Off. . |
| WO87/04579 | 7/1987 | PCT Int'l Appl. . |
| WO90/04316 | 4/1990 | PCT Int'l Appl. . |

OTHER PUBLICATIONS

"ISDN Field Trials in the Belgian, Italian, and Spanish Networks", *Electrical Communications*, vol. 59, No. ½, 1985.

"Prelude: An Asynchronous Time-Division Switched Network", J. Coudreuse et al., *Proceedings IEEE Int'l Conf. on Communications* 1987, pp. 769-773.

"Dynamic TDM—A Packet Approach to Broadband Networking", L. T. Wu et al., *Proceedings IEEE Int-'Conf. on Communications* 1987, vol. 3, pp. 1585-1592.

*Primary Examiner*—Douglas W. Olms
*Assistant Examiner*—T. Samuel
*Attorney, Agent, or Firm*—Ware, Fressola, Van Der Sluys & Adolphson

[57] ABSTRACT

In this system STM (Synchronous Transfer Mode) and ATM (Asynchronous Transfer Mode) cell streams are supplied to corresponding STM and ATM switching exchanges STME and ATME via the cascade connection of a multiplexer (MUX), a transmission link (LI) and a demultiplexer (DMUX). The MUX and DMUX are each constituted by a switching element with a plurality of inputs (II/2; I3) and outputs (03, 04/5) coupled to a common switching means (SB1, TM1; SB2, TM2) via respective receiver (RC1/3) and transmitter (TC1/3) circuits. The common switching means samples the input cell streams at a frequency at least equal to the sum of the time slot frequencies of the time frames of the input cell streams. The time frames of the input and output cell streams are phase synchronous and the sampling of the input cell streams is performed in a predetermined order. The cells of the resultant (STM/ATM) cell stream are supplied to the transmitter circuits in function of their destination.

5 Claims, 1 Drawing Sheet

COMMUNICATION SYSTEM FOR TRANSMITTING SYNCHRONOUS AND ASYNCHRONOUS CELL STREAMS OVER A SINGLE TRANSMISSION LINK

BACKGROUND OF THE INVENTION

1. Field of the Invention

The present invention relates to a communication switching system including at least a multiplexer to first and second input terminals of which a first input cell stream and a second input cell stream are applied respectively, said first and second cell streams comprising first and second cells occupying predetermined and arbitrary time slots of respective first and second time frames having a first and a second time slot frequency respectively, and which provides at its output terminal an output cell stream wherein said first and second cells occupy predetermined and arbitrary time slots of a third time frame having a third time slot frequency, each of said cells comprising data.

2. Description of the Prior Art

Such a communication switching system is described in the German patent application No. P3742939.6 (H. Weik 1) filed on Dec. 18, 1987. Therein the multiplexer inserts the second or ATM (Asynchronous Transfer Mode) cells of the second input cell stream in free time slots of the first input cell stream comprising first or STM (Synchronous Transfer Mode) cells the resultant cell stream being the output cell stream. This means that the known multiplexer is specially adapted to be used in a hybrid STM/ATM communication witching system and not in a purely ATM communication switching system. Eventual evolution towards the latter would thus necessitate another type of multiplexer.

SUMMARY OF THE INVENTION

An object of the present invention is to provide a communication switching system of the above type, but making use of a multiplexer which is particularly advantageous from an economic point of view and may also be used for when all cell streams are ATM cell streams.

According to the present invention this object is achieved due to the fact that said time frames are phase synchronous with respect to each other and said third frequency is at least equal to the sum of said first and second frequencies and that said multiplexer is constituted by a switching element comprising a common switching means to which said input and output terminals are coupled via respective receiver and transmitter circuits and which samples said input cell streams in a predetermined order and at said third frequency and supplies the resultant cell stream having said third time frame to said transmitter circuit(s).

The invention is based on the insight that the switching element disclosed in the PCT application published under No. WO87/04579 (P. Debuysscher 3), though it is used therein for the switching of ATM input cell streams, can be used as a multiplexer of ATM and STM input cell streams. Indeed, when the time frames of the input and output cell streams are phase synchronous and when also the above frequency relation is satisfied the sampling of the input cell streams in a predetermined order produces an output cell stream wherein the order of the STM and ATM cells is respected and wherein the STM cells still occupy predetermined time slots. Moreover, this multiplexer may be used irrespective of the synchronous or asynchronous nature of these streams.

Another characteristic feature of the present communication switching system is that said resultant cell stream obtained by sampling is supplied to a single said transmitter circuit which provides said output cell stream at its said output.

Still another characteristic feature of the present communication switching system is that it further includes a demultiplexer to an input terminal of which said output cell stream is applied and to first and second output terminals of which a first switching exchange for processing said first cell streams and a second switching exchange for processing said second cell streams are connected respectively, and that said demultiplexer is constituted by a switching element comprising a common switching means to which the input terminal and the first and second output terminals of said demultiplexer are coupled via respective receiver and transmitter circuits and which samples said output cell stream at said third frequency and supplies the resultant cell stream, having said third time frame, to said transmitter circuits wherein each of the cells is entered depending on the cell belonging to said first or second cell streams respectively, as indicated in a header of these cells.

Yet another characteristic feature of the present communication switching system is that said second switching exchange is built up by means of switching elements of the same structure as those used in said multiplexer and demultiplexer circuits.

Hence not only the above second switching exchange can be based on a single type switching element but the latter can also be used in the above multiplexer and demultiplexer circuits, thus ensuring large scale standardisation.

DESCRIPTION OF THE DRAWINGS

The above mentioned and other objects and features of the invention will become more apparent and the invention itself will be best understood by referring to the following description of an embodiment taken in conjunction with the accompanying drawing wherein.

DETAILED DESCRIPTION OF THE PREFERRED EMBODIMENT

Figure 1:
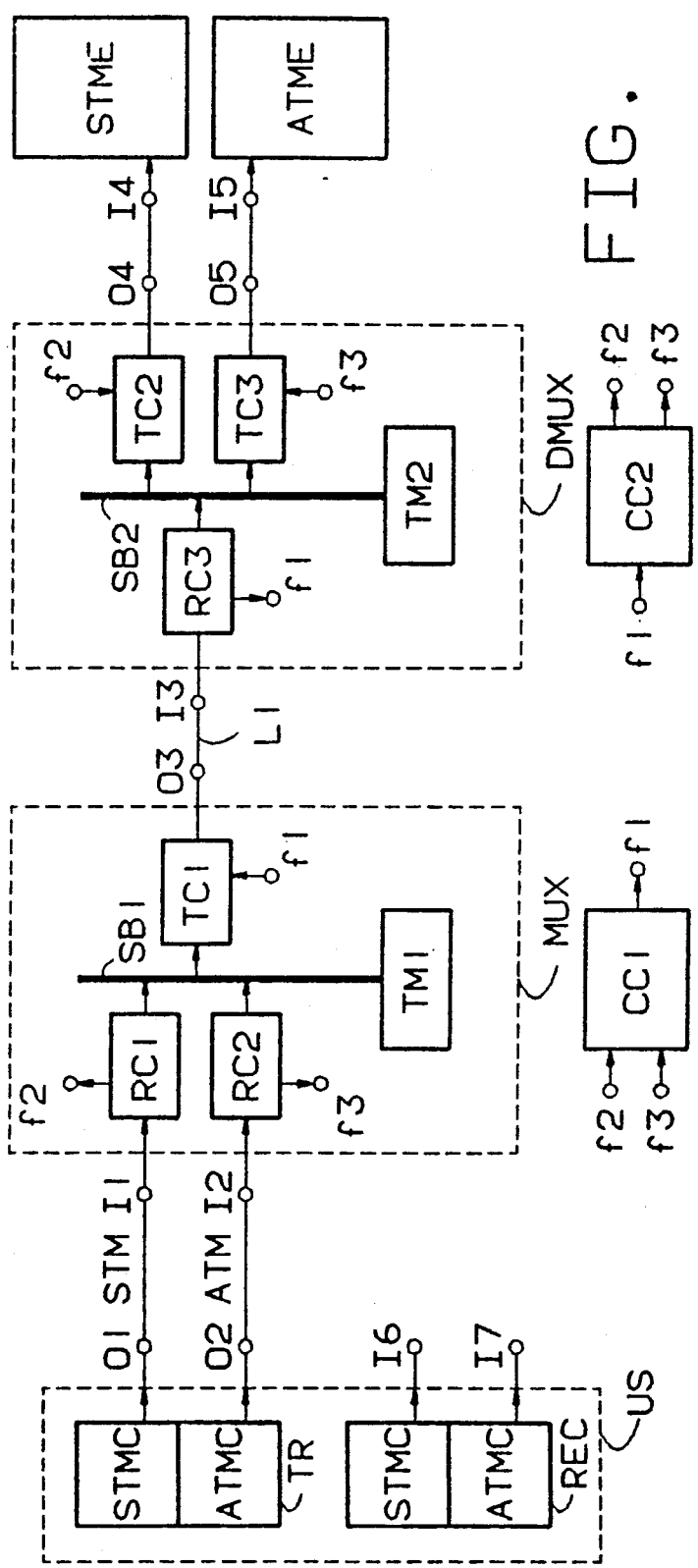
FIG. 1 represents part of a communication switching system according to the invention

The communication switching system shown in FIG. 1 includes a plurality of user stations, such as US, including a transmitter TR and a receiver REC which are each coupled to a communication switching exchange STME operation in the STM or Synchronous Transfer Mode, as well as to a communication switching exchange ATME working in the ATM or Asynchronous Transfer Mode. The switching exchange STME is for instance a narrow band ISDN exchange of the type described in the article "System 12. ISDN Field Trials in the Belgian, Italian and Spanish Networks" by F. Haerens et al, Electrical Communication, Volume 59, Number 1/2, 1985, pp. 89-97. The exchange ATME is e.g. of the type disclosed in the above mentioned PCT application.

Because the connections to the switching exchanges STME and ATME are similar for both TR and REC only the connection between TR and these exchanges is represented in the drawing.

The transmitter TR includes a circuit STMC which is able to generate an STM stream of cells of bits. This means that the cells of this stream which are called STM cells occupy predetermined time slots of a time frame with time slot frequency f2. The transmitter TR also includes a circuit ATMC which is able to generate an ATM cell stream of bits. In such a cell stream the cells which are called ATM cells occupy arbitrary time slots of a time frame with time slot frequency f3.

The cells of the STM and ATM cell streams each have a header containing an indication that an STM or an ATM cell is concerned, i.e. directed to the destination switching exchange STME or ATME.

The output terminals O1 and O2 of the circuits STMC and ATMC are connected to respective input terminals I1 and I2 of a multiplexer MUX having an output terminal O3. The latter is coupled via a transmission link L1 to the input terminal I3 of a demultiplexer DMUX having output terminals O4 and O5 which are connected to input terminals I4 and I5 of the switching exchanges STME and ATME respectively.

Both the multiplexer MUX and the demultiplexer DMUX make use of a switching element of the type disclosed in the above mentioned PCT application. Such a switching element comprises a common switching means which is constituted by a TDM (Time Division Multiplex) bus and an associated timing circuit, and has a plurality of input and output terminals coupled to the common switching means via respective receiver and transmitter circuits. Each such receiver circuit includes the cascade connection of a time frame clock extraction circuit and an input queue wherein the cells of an input cell stream are entered under the control of the clock extracted therefrom by the clock extraction circuit. The output portion of the input queue is controlled by the common switching means which operates at a predetermined time slot frequency of an output time frame equal to the sum of the time slot frequencies of the input time frames of the input cell streams fed to the receiver circuits. The common switching means checks, in a predetermined order, the presence of complete cells in all the input queues and enters these cells in respective time slots of the output time frame having the above mentioned predetermined frequency. In other words, the common switching means samples the input cell streams at the predetermined time slot frequency. It then supplies the resultant cell stream to the transmitter circuits which enter the cells in function of their header and output these cells, possibly at another time slot frequency.

The switching element included in the multiplexer MUX is of the above type but has only two input terminals I1, I2 and one output terminal O3 and comprises a timing circuit TM1 which is connected to a common switching bus SB1 to which the terminals I1, I2 and O3 are connected via respective receiver and transmitter circuits RC1, RC2 and TC1. The receiver circuits RC1 and RC2 extract the time slot frequencies f2 and f3 from the cell streams applied to their inputs I1, I2 and in the clock circuit CC1 these frequencies f2, f3 are used to derive the sampling frequency f1 of the timing circuit TM1. As mentioned above this last frequencies can be larger than the sum of the other two frequencies, but the minimum value will be assumed in what follows. Also the output portion of the transmitter circuit TC1 operates at the time slot frequency f1.

The switching element included in the demultiplexer DMUX is also of the above type, but has only one input terminal I3 and two output terminals O4, O5 and comprises a timing circuit TM2 which is connected to a common switching bus SB2 to which the terinals I3, O3 and O4 are connected via respective receiver and transmitter circuits RC3, TC2 and TC3. The receiver circuit RC3 extracts the time slot frequency f1 from the cell stream applied to its input I3. This frequency f1 is the sampling frequency of the timing circuit TM2 and it is used in the clock circuit CC2 to derive the time slot frequencies f2 and f3 of the output frames at the outputs of the transmitter circuits TC2 and TC3.

In order that the multiplexer and demultiplexer should operate correctly the above time slot frequencies f1, f2 and f3 of the time frames of the cell streams should be phase synchronous with respect to each other. This phase constraint is not needed for the system of the above PCT application, i.e. the time frames are allowed to shift with respect to each other.

Figure 2:
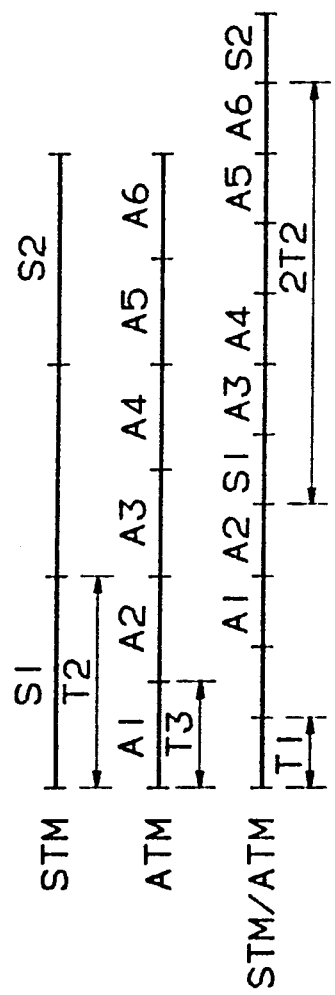
FIG. 2 is a time diagram to illustrate the operation of the system of FIG. 1.

The reason for this phase synchronism will appear below when considering the particular example, shown in FIG. 2, of f3 being twice f2, f1 being still chosen as their sum, so that the corresponding periods T3 and T2 are in an inverse ratio while T1, the period corresponding to f1, is one third of T2.

The cells S1, S2, ... of the STM input cell stream are entered in the receiver circuit RC1 at the time slot frequency f2 extracted from that stream, whilst the cells A1, A2, ... of the ATM input cell stream are entered in the receiver circuit RC2 at the time slot frequency f3 extracted from that stream.

Under the control of the timing circuit TM1 the STM and ATM cell streams are converted to an STM/ATM cell stream at the time slot frequency f1. This happens as follows by a sampling operation.

At the end of each of the periods or time slots T1 of its time frame the timing circuit TM1 consults the receiver circuits RC2 and RC1 in this predetermined order to check if they contain a complete cell and in the affirmative it subsequently inserts this cell in the next available free time slot T1 of this time frame. More particularly, for the cells S1, S2, ... and A1, A2, ... illustrated in FIG. 2, the following happens:

- at the end of the first time slot T1 shown the timing circuit TM1 does not find a complete cell in the receiver circuits RC2 and RC1;
- at the end of the second time slot T1, TM1 detects the presence of a complete cell A1 in RC2 and the absence of such a cell in RC1. Therefore it inserts the cell A1 in the third time slot T1 of its time frame;
- at the end of the third time slot T1 TM1 detects the presence of a complete cell A2 in RC2 and of a complete cell S1 in RC1. As a consequence the cells A2 and S1 are inserted in the fourth and fifth time slots T1 of the output time frame respectively, etc.

Because the time frames of the cell streams STM, ATM and STM/ATM are phase synchronous and have time slot frequencies such that f1=f2+f3, in the cell stream STM/ATM the STM cells S1, S2, ... as well as the ATM cells A1, A2, ... have the same order as in the individual cell streams STM and ATM. Moreover, the STM cells S1, S2, ... still occupy the predetermined time slots. For instance S1 and S2 are at a time distance equal to 2T2 as in the STM cell stream.

The above STM/ATM cell stream is fed to the single transmitter circuit TC1, independent from the header since there is only one such transmitter circuit. The latter then transmits this stream at the time slot frequency f1 over the link L1 towards the demultiplexer DMUX. Therein this cell stream is entered in the receiver circuit RC3 at the time slot frequency f1 extracted from this stream. Under the control of the timing circuit TM2 the cells S1, S2, ... A1, A2, ... of this cell stream are then applied to the respective transmitter circuits TC2 and TC3 in function of their header indicating that STM and ATM cells are concerned respectively. These cell streams are finally transmitted to the switching exchanges STME and ATME at the time slot frequencies f2 and f3 respectively.

It should be noted that when the above described STM/ATM communication switching system evolves to a full ATM system the same multiplexer and demultiplexer can be used. However the phase synchronism is the no longer required.

Instead of the switching element according to the above mentioned PCT application also that according to the PCT application No. PCT/EP88/00897 (P. Barri 5) could be used.

I claim:

1. A communication switching system including at least a multiplexer (MUX) having first (I1) and second (I2) input terminals to which a first input cell stream (STM) and a second input cell stream (ATM) are applied respectively, said first and second cell streams comprising first (S1, S2, ...) and second (A1, A2, ...) cells occupying predetermined and arbitrary time slots of respective first and second time frames having a first (f2) and a second (f3) time slot frequency respectively, said multiplexer (MUX) having an output terminal (03) which provides an output cell stream (STM/ATM) wherein said first (S1, S2, ...) and second (A1, A2, ...) cells occupy predetermined and arbitrary time slots of a third time frame having a third time slot frequency (f1), each of said cells comprising data, characterized in that said time frames are phase synchronous with respect to each other and said third frequency (f1) is at least equal to the sum of said first (f2) and second (f3) frequencies and that said multiplexer (MUX) is constituted by a switching element comprising a common switching means (SB1, TM1) to which said input (I1/2) and output (03) terminals are coupled via respective receiver (RC1/2) and transmitter (RC1) circuits and which samples said input cell streams (STM, ATM) in a predetermined order and at said third frequency (F1) and supplies the resultant cell stream having said third time frame to said transmitter circuit(s).

2. Communication switching system according to claim 1, characterized in that said resultant cell stream obtained by sampling is supplied to a single said transmitter circuit (TC1) which provides said output cell stream (STM/ATM) at its said output (03).

3. Communication switching system according to claim 2, characterized in that it further includes a demultiplexer (DMUX) having an input terminal (I3) to which said output cell stream (STM/ATM) is applied and first (04) and second (05) output terminals to which a first switching exchange (STME) for processing said first cell streams (STM) and a second switching exchange (ATME) for processing said second cell streams are connected respectively, and that said demultiplexer (DEMUX) is constituted by a switching element comprising a common switching means (SB2, TM2) to which the input terminal (I3) and the first (04) and second (05) output terminals of said demultiplexer are coupled via respective receiver (RC3) and transmitter (TC2/3) circuits and which samples said output cell stream (STM/ATM) at said third frequency and supplies the resultant cell stream, having said third time frame, to said transmitter circuits (TC2/3) wherein each of the cells is entered depending on the cell belonging to said first (STM) or second (ATM) cell streams respectively, as indicated in a header of these cells.

4. Communication switching system according to claim 3, characterized in that said transmitter circuits (TC2/3) of said demultiplexer (DEMUX) provide said first cells to said first switching exchange (STME) at said first frequency (f2), and provide said second cells to said second switching exchange (ATME) at said second frequency (f3) respectively.

5. Communication switching system according to claim 3, characterized in that said second switching exchange (ATME) is built up by means of switching elements of the same structure as those used in said multiplexer (MUX) and demultiplexer circuits (DMUX).

* * * * *

UNITED STATES PATENT AND TRADEMARK OFFICE
CERTIFICATE OF CORRECTION

PATENT NO. : 5,173,901

DATED : December 22, 1992

INVENTOR(S) : M. DeSomer

It is certified that error appears in the above-identified patent and that said Letters Patent is hereby corrected as shown below:

Title page,
Abstract, item 57, line 6, please delete "(LI)" and insert --(L1)--.

Abstract, item 57, line 9, please delete "(II/2; I3)" and insert --(I1/2; I3)--.

At column 5, line 45, please delete "(RC1)" and insert --(TC1)--.

Signed and Sealed this

Twenty-first Day of December, 1993

Attest:

BRUCE LEHMAN

Attesting Officer  Commissioner of Patents and Trademarks